Patented Mar. 15, 1932

1,849,867

UNITED STATES PATENT OFFICE

CLARENCE R. ECKERT, OF ENGLEWOOD, NEW JERSEY, ASSIGNOR TO THE BARRETT COMPANY, A CORPORATION OF NEW JERSEY

COMPOSITION OF MATTER

No Drawing.   Application filed September 10, 1926.  Serial No. 134,755.

This invention relates to a composition of matter and relates more particularly to a mixture of paracumarone resin and asphalt.

It has been the practice for years to produce roll roofing and shingle elements by saturating raw felt or other fibrous base with asphalt and thereafter applying to the saturated felt a coating of asphalt, to which may or may not be applied crushed mineral wear-resisting material such as crushed slate, stone, etc.

Those engaged in the roofing industry have experienced considerable difficulty at times in finding a felt saturating or coating asphalt which can be brought to the proper fluidity by the use of heat without distilling therefrom valuable oils which should be retained therein. Difficulty has also been experienced in finding an asphalt which would not be brittle at cold atmospheric temperatures and which would have the proper firmness at ordinary atmospheric temperatures.

I have discovered that asphalt may be materially enhanced in its properties for saturating, coating and other purposes by intimately mixing with the asphalt a small quantity of paracumarone resin, which is known in the trade and will be hereinafter referred to as "Cumar."

Different melting point asphalts are used for different purposes, consequently, my invention contemplates the treatment of various kinds of asphalt and I do not intend that my invention shall be limited to any specific melting point or grade of either asphalt or "Cumar." The asphalts which I have found it most satisfactory to employ, range in melting point from about 90° F. to 240° F. The "Cumar" which I have found most satisfactory has a melting point of between 90° F. and 130° F. Altho I have found that materials having these melting points are most satisfactory, it is entirely within the scope of this invention to employ materials having melting points outside of the ranges mentioned.

Where I desire to change the characteristics of asphalt only to a slight degree I may add to the asphalt, for instance, approximately 2 or 3% by weight, based on the total weight of the resultant composition, of "Cumar" so that the resultant composition contains from 97% to 98% asphalt and from 3% to 2% "Cumar." If it is desired to change the characteristics of the asphalt very materially, I have found that as high as 40% or more, by weight of "Cumar" based on the weight of the resultant composition may be added to the asphalt. The "Cumar" used may be refined or a cheap commercial grade.

Altho I do not intend to be limited by any specific example, it may be stated that I have found that a very satisfactory saturating compound (for roofing felt, etc.) may be prepared by melting approximately 75 parts of asphalt having a melting point of about 120° F., by melting approximately 25 parts of a cheap commercial grade of "Cumar" having a melting point of about 110° F. and thereafter mixing these two elements in the proportions stated, in any suitable mixing device. Altho it is better to intimately mix the constituents, I have had good success with a composition prepared by the ordinary degree of mixing which is usually accorded to such materials.

All that it is necessary to do in preparing my new and useful composition is to heat the asphalt and "Cumar" to fluidity and to then thoroughly mix the two ingredients while still fluid, in a mixing tank, agitator or other convenient device. The asphalt may be heated in one tank and the "Cumar" in another and the two ingredients then conducted to the agitator or the two ingredients may be heated in the agitator itself and then mixed. In any event the agitator is maintained at such a temperature as to maintain the ingredients fluid while being mixed. The mixture may then be removed from the agitator to storage or may be conducted directly to whatever use is desired.

I have found that the admixture of "Cumar" with asphalt imparts at least two very desirable qualities to the asphalt, namely the fluidity thereof when heated is greatly increased and quite an unexpected firmness is imparted to the mixture when at atmospheric temperatures. I have also found my improved composition is less brittle at colder temperatures than the ordinary commercial asphalt.

Thus, my improved composition is ideal for coating or saturating roofing felt, imparting to the product firmness yet proper flexibility at the desired temperatures. I have also found my improved composition useful as an insulating material, either when molded or when used to coat or impregnate insulating fabric; it may also be used with advantage as a paint or coating for metal or other materials, being applied warm if necessary to obtain the proper fluidity.

I claim:

1. A composition of matter suitable for impregnating roofing felt, consisting of from 60 to 98% asphalt having a melting point of not less than 90° F. and from 40 to 2% paracumarone resin, and which is relatively more fluid than said asphalt at elevated temperatures.

2. A composition of matter suitable for impregnating roofing felt, consisting of a minor proportion of paracumarone resin and a major proportion of bituminous material, said composition being more fluid than said bituminous material at elevated temperatures and being less brittle than said bituminous material at atmospheric temperatures.

3. A composition of matter suitable for impregnating roofing felt, consisting of a mixture of approximately 75 parts of asphalt having a melting point of about 120° F. and approximately 25 parts of paracumarone resin having a melting point of approximately 110° F.

4. A composition of matter suitable for impregnating roofing felt, consisting of from 60 to 98% asphalt having a melting point of from about 90° F. to about 240° F. and from 40 to 2% paracumarone resin having a melting point of from about 90° F. to about 130° F., and which is relatively more fluid than said asphalt at elevated temperatures.

5. The process of preparing a composition of matter which is suitable for the impregnation of roofing felt, which process consists of melting from 60 to 98% asphalt having a melting point of not less than about 90° F., and intimately mixing said asphalt with from 40 to 2% molten paracumarone resin to form a composition which is relatively more fluid than said asphalt at elevated temperatures.

6. The process of preparing a composition of matter which is suitable for impregnation of roofing felt, which process involves melting from 60 to 98% asphalt substantially solid at atmospheric temperatures and from 40 to 2% paracumarone resin, and mixing the asphalt and paracumarone resin while in molten condition to form a composition consisting of from 60 to 98% asphalt and from 40 to 2% paracumarone resin.

7. The process of preparing a composition of matter which is suitable for the impregnation of roofing felt, which process consists in mixing a minor proportion of paracumarone resin and a major proportion of asphalt having a melting point of not less than about 90° F., and mixing the asphalt and paracumarone resin while in molten condition to form a composition which is relatively more fluid than said asphalt at elevated temperatures.

8. A roofing element comprising a felt base impregnated with a composition consisting of from 60 to 98% asphalt having a melting point of not less than 90° F. and from 40 to 2% paracumarone resin, said composition being relatively more fluid than said asphalt at elevated temperatures.

9. A roofing element comprising a felt base impregnated with a composition consisting of a minor proportion of paracumarone resin and a major proportion of bituminous material, said composition being more fluid than said bituminous material at elevated temperatures and being less brittle than said bituminous material at atmospheric temperatures.

10. A fibrous element coated with a composition consisting of a minor proportion of paracumarone resin and a major proportion of bituminous material, said composition being more fluid than said bituminous material at elevated temperatures and being less brittle than said bituminous material at atmospheric temperatures.

11. A roofing element comprising a fibrous base impregnated with a composition consisting of a mixture of approximately 75 parts of asphalt having a melting point of about 120° F. and approximately 25 parts of paracumarone resin having a melting point of approximately 110° F.

12. A fibrous element coated with a composition consisting of from 60 to 98% asphalt having a melting point of from about 90° F. to about 240° F. and from 40 to 2% of paracumarone resin having a melting point of from 90° F. to about 130° F. and which is relatively more fluid than said asphalt at elevated temperatures.

In testimony whereof I affix my signature.

CLARENCE R. ECKERT.